(12) United States Patent
Goenka et al.

(10) Patent No.: US 11,501,019 B2
(45) Date of Patent: *Nov. 15, 2022

(54) SECURING DIGITAL CONTENT USING SEPARATELY AUTHENTICATED HIDDEN FOLDERS

(71) Applicant: YAHOO ASSETS LLC, Dulles, VA (US)

(72) Inventors: Mohit Goenka, Santa Clara, CA (US); Ashish Khushal Dharamshi, Sunnyvale, CA (US); Nikita Varma, Milpitas, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 75 days.

This patent is subject to a terminal disclaimer.

(21) Appl. No.: 17/157,214

(22) Filed: Jan. 25, 2021

(65) Prior Publication Data

US 2021/0141934 A1 May 13, 2021

Related U.S. Application Data

(63) Continuation of application No. 15/834,109, filed on Dec. 7, 2017, now Pat. No. 10,902,148.

(51) Int. Cl.
*H04L 29/00* (2006.01)
*G06F 21/62* (2013.01)
(Continued)

(52) U.S. Cl.
CPC .......... *G06F 21/6245* (2013.01); *G06F 21/31* (2013.01); *G06F 21/46* (2013.01); *H04L 9/3226* (2013.01); *H04L 51/212* (2022.05); *H04L 63/083* (2013.01); *H04L 63/123* (2013.01); *H04L 67/535* (2022.05); *H04L 67/75* (2022.05);
(Continued)

(58) Field of Classification Search
CPC ...... G06F 21/6245; G06F 21/31; G06F 21/46; G06F 2221/2113; H04L 9/3226; H04L 51/212; H04L 63/083; H04L 63/123; H04L 67/535; H04L 67/75; H04L 9/0643;
(Continued)

(56) References Cited

U.S. PATENT DOCUMENTS 8,181,156 B1 * 5/2012 Bobykin ............... G06F 16/958
717/120
9,203,791 B1 * 12/2015 Olomskiy ........... G06F 21/6245
(Continued)

*Primary Examiner* — Don G Zhao
(74) *Attorney, Agent, or Firm* — James J. DeCarlo; Greenberg Traurig, LLP

(57) ABSTRACT

Systems and methods for securing digital content using hidden folders are disclosed. In one embodiment, a method comprises displaying an application, the application including a user interface for displaying digital content items and receiving input events; monitoring keystrokes entered by a user of the client device while the application is displayed; generating a candidate passcode based on the keystrokes; determining that the candidate passcode is a valid passcode has been entered when the candidate passcode is equal to a known passcode; transmitting a request for one or more hidden items from a server device, the request including the valid passcode; receiving the one or more hidden items; and updating the user interface to display the one or more hidden items.

20 Claims, 9 Drawing Sheets

(51) Int. Cl.
  *H04L 9/40*      (2022.01)
  *G06F 21/46*     (2013.01)
  *H04L 9/32*      (2006.01)
  *G06F 21/31*     (2013.01)
  *H04L 51/212*    (2022.01)
  *H04L 67/75*     (2022.01)
  *H04L 67/50*     (2022.01)
  *H04L 9/06*      (2006.01)
  *H04L 67/025*    (2022.01)
  *H04L 51/58*     (2022.01)

(52) U.S. Cl.
  CPC .... *G06F 2221/2113* (2013.01); *H04L 9/0643* (2013.01); *H04L 51/58* (2022.05); *H04L 67/025* (2013.01); *H04L 2463/082* (2013.01)

(58) Field of Classification Search
  CPC ... H04L 51/58; H04L 67/025; H04L 2463/08; H04L 2463/082
  See application file for complete search history.

(56) References Cited

U.S. PATENT DOCUMENTS

| | | | | |
|---|---|---|---|---|
| 9,648,011 | B1* | 5/2017 | Mattsson | H04L 9/3226 |
| 2002/0010684 | A1* | 1/2002 | Moskowitz | H04L 9/30 |
| | | | | 713/176 |
| 2005/0185773 | A1* | 8/2005 | Burger | H04M 7/006 |
| | | | | 379/88.01 |
| 2006/0217992 | A1* | 9/2006 | Hanna | H04N 1/00912 |
| | | | | 358/1.15 |
| 2008/0301460 | A1* | 12/2008 | Miller | H04L 63/0815 |
| | | | | 713/183 |
| 2009/0089415 | A1* | 4/2009 | Lecomte | G06F 16/95 |
| | | | | 709/224 |
| 2009/0100518 | A1* | 4/2009 | Overcash | G06F 21/552 |
| | | | | 726/22 |
| 2009/0138592 | A1* | 5/2009 | Overcash | H04L 63/1425 |
| | | | | 709/224 |
| 2009/0172101 | A1* | 7/2009 | Arthursson | G06F 3/0486 |
| | | | | 709/205 |
| 2010/0169437 | A1* | 7/2010 | Zimmet | G06Q 20/10 |
| | | | | 709/206 |
| 2011/0055593 | A1* | 3/2011 | Lurey | G06F 21/6218 |
| | | | | 713/193 |
| 2011/0191366 | A1* | 8/2011 | Eustace | H04L 67/02 |
| | | | | 715/752 |
| 2011/0314376 | A1* | 12/2011 | Dearman | G06F 9/453 |
| | | | | 715/711 |
| 2011/0316858 | A1* | 12/2011 | Shen | G06F 3/0486 |
| | | | | 345/173 |
| 2012/0066757 | A1* | 3/2012 | Vysogorets | G06F 21/34 |
| | | | | 726/9 |
| 2012/0110087 | A1* | 5/2012 | Culver | G06Q 10/101 |
| | | | | 709/205 |
| 2012/0110515 | A1* | 5/2012 | Abramoff | G06F 16/904 |
| | | | | 715/854 |
| 2013/0091564 | A1* | 4/2013 | Fitzgerald | G06F 21/88 |
| | | | | 726/17 |
| 2013/0145148 | A1* | 6/2013 | Shablygin | H04L 63/0853 |
| | | | | 713/155 |
| 2013/0145172 | A1* | 6/2013 | Shablygin | G06F 21/33 |
| | | | | 713/185 |
| 2013/0145173 | A1* | 6/2013 | Shablygin | G06F 21/34 |
| | | | | 713/185 |
| 2013/0205370 | A1* | 8/2013 | Kalgi | G06F 21/316 |
| | | | | 726/3 |
| 2013/0208893 | A1* | 8/2013 | Shablygin | H04L 9/3234 |
| | | | | 380/277 |
| 2013/0212704 | A1* | 8/2013 | Shablygin | G06F 21/6218 |
| | | | | 726/28 |
| 2014/0164944 | A1* | 6/2014 | Sivakumar | G06F 16/9577 |
| | | | | 715/746 |
| 2014/0258717 | A1* | 9/2014 | Baek | H04L 63/0428 |
| | | | | 713/165 |
| 2015/0180875 | A1* | 6/2015 | Kay | H04L 63/10 |
| | | | | 726/4 |
| 2015/0281155 | A1* | 10/2015 | Cue | H04L 51/212 |
| | | | | 715/752 |
| 2015/0300232 | A1* | 10/2015 | Matsumoto | F01N 11/00 |
| | | | | 701/34.4 |
| 2015/0326620 | A1* | 11/2015 | Kohnen | G06F 3/04842 |
| | | | | 715/730 |
| 2015/0338974 | A1* | 11/2015 | Stone | G06F 3/04845 |
| | | | | 345/173 |
| 2016/0142413 | A1* | 5/2016 | Diep | H04L 63/10 |
| | | | | 726/4 |
| 2016/0308840 | A1* | 10/2016 | Munshi | H04L 51/066 |
| 2016/0323217 | A1* | 11/2016 | Subramani | G06F 40/274 |
| 2016/0335430 | A1* | 11/2016 | Zhou | G06F 21/52 |
| 2016/0344720 | A1* | 11/2016 | Nayak | H04L 63/083 |
| 2017/0041296 | A1* | 2/2017 | Ford | G06F 21/64 |
| 2017/0109447 | A1* | 4/2017 | Wu | G06Q 10/1095 |
| 2017/0124291 | A1* | 5/2017 | Barken | G16Z 99/00 |
| 2017/0180378 | A1* | 6/2017 | Tyler | H04L 63/1433 |
| 2017/0200122 | A1* | 7/2017 | Edson | H04L 63/104 |
| 2017/0242990 | A1* | 8/2017 | Chien | H04L 9/32 |
| 2018/0102023 | A1* | 4/2018 | Baszucki | A63F 13/33 |
| 2018/0173929 | A1* | 6/2018 | Han | H04L 63/105 |
| 2018/0198799 | A1* | 7/2018 | Parthasarathy | H04L 51/08 |
| 2018/0359233 | A1* | 12/2018 | Alexander | H04L 63/0861 |
| 2019/0107944 | A1* | 4/2019 | Glass | G06F 3/04886 |
| 2019/0180046 | A1* | 6/2019 | Goenka | G06F 21/31 |
| 2019/0306142 | A1* | 10/2019 | Gujral | H04L 67/53 |
| 2019/0347181 | A1* | 11/2019 | Cranfill | H04L 67/04 |
| 2020/0089910 | A1* | 3/2020 | Paz | G06F 21/629 |

* cited by examiner

SECURING DIGITAL CONTENT USING SEPARATELY AUTHENTICATED HIDDEN FOLDERS

CROSS-REFERENCE TO RELATED APPLICATIONS

This patent application claims the benefit of and is a continuation of U.S. patent application Ser. No. 15/834,109, filed on Dec. 7, 2017, which is incorporated by reference herein in its entirety.

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever

BACKGROUND

Technical Field

The disclosed embodiments related to the field of digital content security and, in particular, to systems, devices, and methods for securing email messages and other content using a multi-level authentication scheme and automatic filtering.

Description of the Related Art

The use of electronic mail (email) has steadily increased since the genesis of digital mail in the 1960s. With the rise of the World Wide Web and mobile connectivity, many systems offer web-based email interfaces (webmail) and mobile email applications, respectively. In lockstep with the increased usage of email, security is of paramount concerns given that users are more commonly using email for secure content.

The primary technique for securing email is through password-based authentication systems. Many webmail clients allow users to enter an email address and password to access their email securely. More recently, many webmail services now offer extra layers of security in the form of, for example, multi-factor authentication. Additionally, some corporate email systems additionally use biometric authentication and other more sophisticated forms of user identification.

Despite these advances in security, each existing technique focuses primarily on verifying that a user is who he or she claims to be at a system level. If an unauthorized user steals another user's password, any other user can access their email account. Since system-level controls govern the access of all email, a breach in security for these controls gives an unauthorized user full access to a user's email.

Currently, no systems provide finer-grained control over the security of individual email messages or groups of email messages. Some solutions involve encrypting and decrypting individual email messages, but these solutions suffer from the same deficiencies below. This problem is exacerbated by many existing webmail providers which eschew the use of any folder-based management and rather rely on labeling, tagging, or other mechanisms to organize an effectively single list of messages.

Thus, there currently exists a need in the art to increase the security of webmail and mobile mail applications. Specifically, there exists a need in the art to enable finer-grained authentication mechanisms to ensure that a breach of a user's system-level credentials does not allow for access to highly sensitive material.

BRIEF SUMMARY

The disclosed embodiments describe a technical solution for solving the authentication problems of current digital content systems (e.g., email systems) such as those discussed above. Specifically, the disclosed embodiments describe a folder-level authentication mechanism and a specific user interface (UI) for enabling the input of folder-level credentials. To minimize the amount of effort, and to accurately route content items to the proper location, the disclosed embodiments also disclose a filtering mechanism to automatically secure digital content items upon receipt.

The disclosure provides an improved digital content system. The system includes one or more server devices connected over a network to one or more client devices. The server devices retrieve mail items from one or more mail servers and processes the mail items for storage in a database as described in more detail herein. Client devices (e.g., webmail or mobile applications) access the server devices via network requests (e.g., HTTP requests, application programming interface (API) calls, etc.) to retrieve mail items from the server devices. As described in more detail herein, each client device includes a mail application configured to support multi-level authentication.

As described above, a mail application on a client device may include a webmail application (e.g., an application delivered via a browser) or a mobile application (e.g., a compiled and installed application). While many functions are similarly performed, other functions may vary depending on the platform (e.g., securing passcodes), as described herein. Using a webmail application as an example, the application includes logic for retrieving and displaying mail items. Additional functionality may include standard email interactions (e.g., moving items, deleting items, replying to items, etc.). In addition to these functions, the application allows users to create folders and assign passcodes to individual folders (or groups of folders). The application additionally includes functionality allowing users to "unlock" a folder using a passcode. In some embodiments, this may be accomplished by supply a form to enter the passcode. However, in other embodiments, the passcode may be entered without any visible UI. For example, the application can be configured to monitor keystrokes of the user and determine that a passcode was entered. Upon determining a valid passcode has been entered, the hidden folders are displayed, and additional functionality (e.g., searching) is enabled. In some embodiments, passcodes may be stored locally on a client device (e.g., in a mobile application) or may be retained on the server devices (e.g., for a webmail application). In some embodiments, the UI may additionally allow users to create rules governing how new items should be filtered into folders. Alternatively, or in conjunction with the preceding, the server devices may be configured to identify rules based on user interactions with the applications transmitted from the client devices to the server devices.

The above applications are supported by one or more server devices as described above. The server devices include indexing and filtering components. The indexing and filtering components receive new mail items, index the content for searching, and filter the items into folders (if applicable). Ultimately, these items are persisted in a database or other data storage mechanism (e.g., a data lake). In some embodiments, the server devices may generate rules for filtering the mail items based on manually defined rules or based on rules inferred from user interactions with mail items. The server devices receive requests from client devices which may include data requests (e.g., mail requests) or logging requests (e.g., interactions with mail items). In some embodiments, these requests may be combined (e.g., a move message may affect an item and be recorded by the server devices as an interaction).

The server devices also include authentication subsystems for both authenticating users at a system-level and at a folder-level. In some embodiments, system-level authentication may be performed as known in the art. However, folder-level authentication may be achieved via monitoring incoming passcode requests from a client device (e.g., when monitoring keystrokes) and determining when a valid passcode has been entered. In some embodiments, these requests may be throttled to prevent brute force attacks. Once detecting a valid passcode, the server devices transmit a message to the client device indicating the passcode is valid. In subsequent requests, the client may transmit a hashed passcode along with any requests for mail items. The server devices may then validate the hashed passcode and provide full access to the secured mail items.

These and other embodiments are discussed more fully in the following disclosure. As briefly summarized above, the disclosure describes client devices, server devices, and systems including each that enable folder-level security of mail items. The embodiments utilize a secure user interface to allow for entering passcodes without clear inputs and throttling to prevent unauthorized attempts to access secured folders.

BRIEF DESCRIPTION OF THE FIGURES

The preceding and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
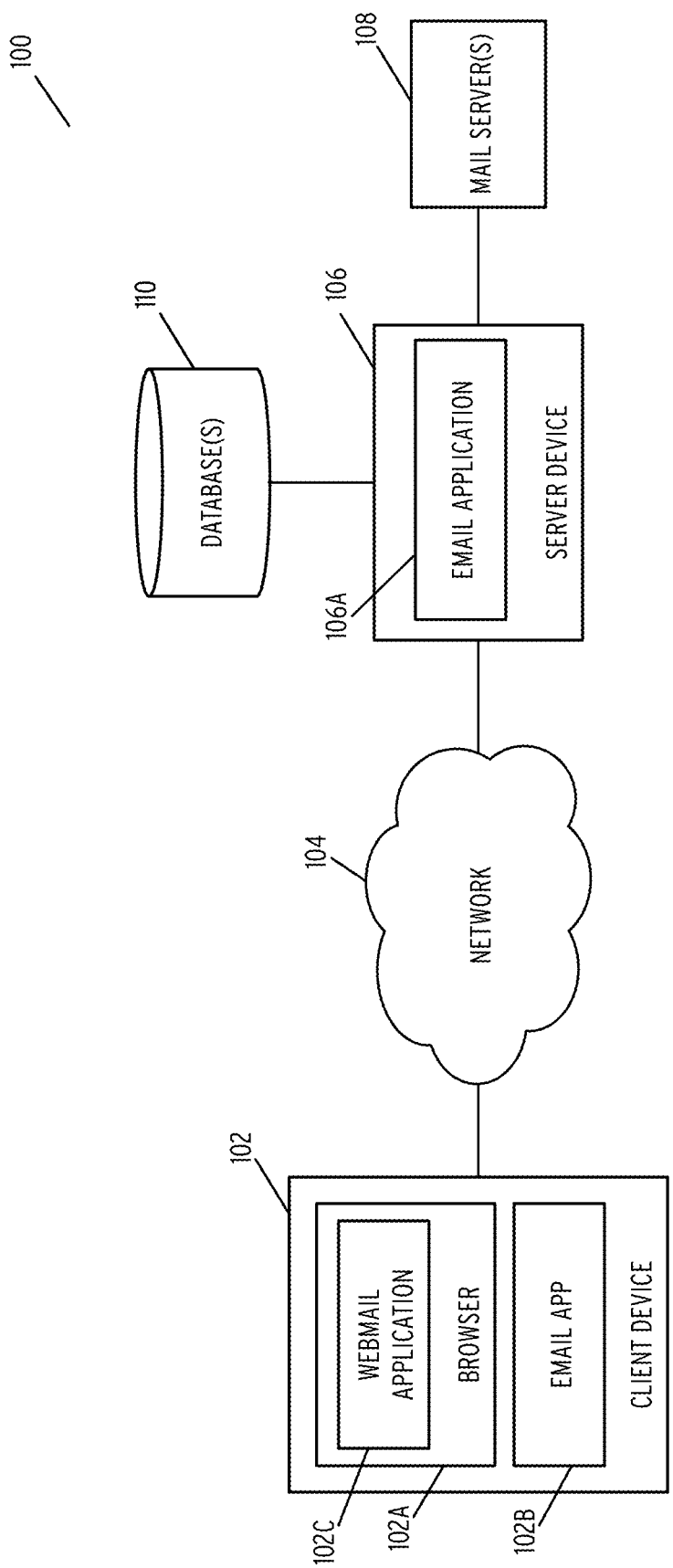
FIG. 1 is a block diagram illustrating a system for providing multi-level authentication of email messages according to some embodiments of the disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/ acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine-readable form. By way of example, and not limitation, a computer readable medium may comprise computer-readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

FIG. 1 is a block diagram illustrating a system for providing multi-level authentication of email messages according to some embodiments of the disclosure.

The system 100 includes a client device 102, network 104, server device 106, mail servers 108, and databases 110. A given client device 102 may include a browser 102A and an email app 102B. The browser 102D may additionally include a webmail client 102C. The server device 106A may include a mail application 106A.

In the illustrated embodiment, a client device 102 may comprise a mobile device or a desktop or laptop computer. In general, client device 102 may comprise any networked computing device including the device depicted in FIG. 9. Client device 102 communicates with various servers (including server 106) via network 104. In one embodiment, network 104 comprises a wide area or local area network.

Client device 102 may be equipped with a web browser 102A. Web browser 102A may comprise a standard web browser (e.g., GOOGLE CHROME, INTERNET EXPLORER, etc.), a mobile web browser, or an embedded web view (e.g., within a mobile application). Generally, web browser 102A comprises any software capable of rendering web pages.

Web browser 102A issues requests for web pages (or applications) including pages hosted by mail server 106 (via mail application 106A). Web browser 102A receives web pages and renders the pages on the client device 102. One of such pages includes a webmail application 102C. Details of the operation of a webmail application 102C are discussed more fully in connection with FIG. 2.

Client device 102 additionally includes an email app 102B. In one embodiment, email app 102B comprises a compiled, installed application on a mobile device. Alternatively, email app 102B may comprise a desktop application executing on a laptop or desktop computer. As will be described herein, both webmail application 102C and email app 102B may execute similar functionality. In some instances, however, the functionality of the webmail application 102C and email app 102B may differ (as discussed in FIG. 4B).

As illustrated in FIG. 1, the system 100 additionally includes a server device 106. Although illustrated as a single device in some embodiments, server device 106 may comprise multiple application servers. The server device 106 is communicatively coupled to a mail server 108. In one embodiment, mail servers 108 comprise third-party or commonly owned mail servers configured to receive and send a message using standard email protocols (e.g., SMTP, IMAP, POP3, etc.). In some embodiments, mail servers 108 provide an API to allow for programmatic access of mail stored by the mail servers 108 by server device 106. Alternatively, or in conjunction with the preceding, mail servers 108 may push data to the server device 106.

In general operation, server 106 retrieves mail from mail server 108 and stores messages in databases 110. Although illustrated as a single device in some embodiments, databases 110 may comprise multiple application servers. In some embodiments, database 110 may be replaced with a content grid or similar big data processing storage system.

Server device 106 includes mail application 106A. In one embodiment, the operations of the server device 106 and the mail application 106A are described in more detail in connection with FIG. 5, the disclosure of which is incorporated herein by reference in its entirety.

Figure 2:
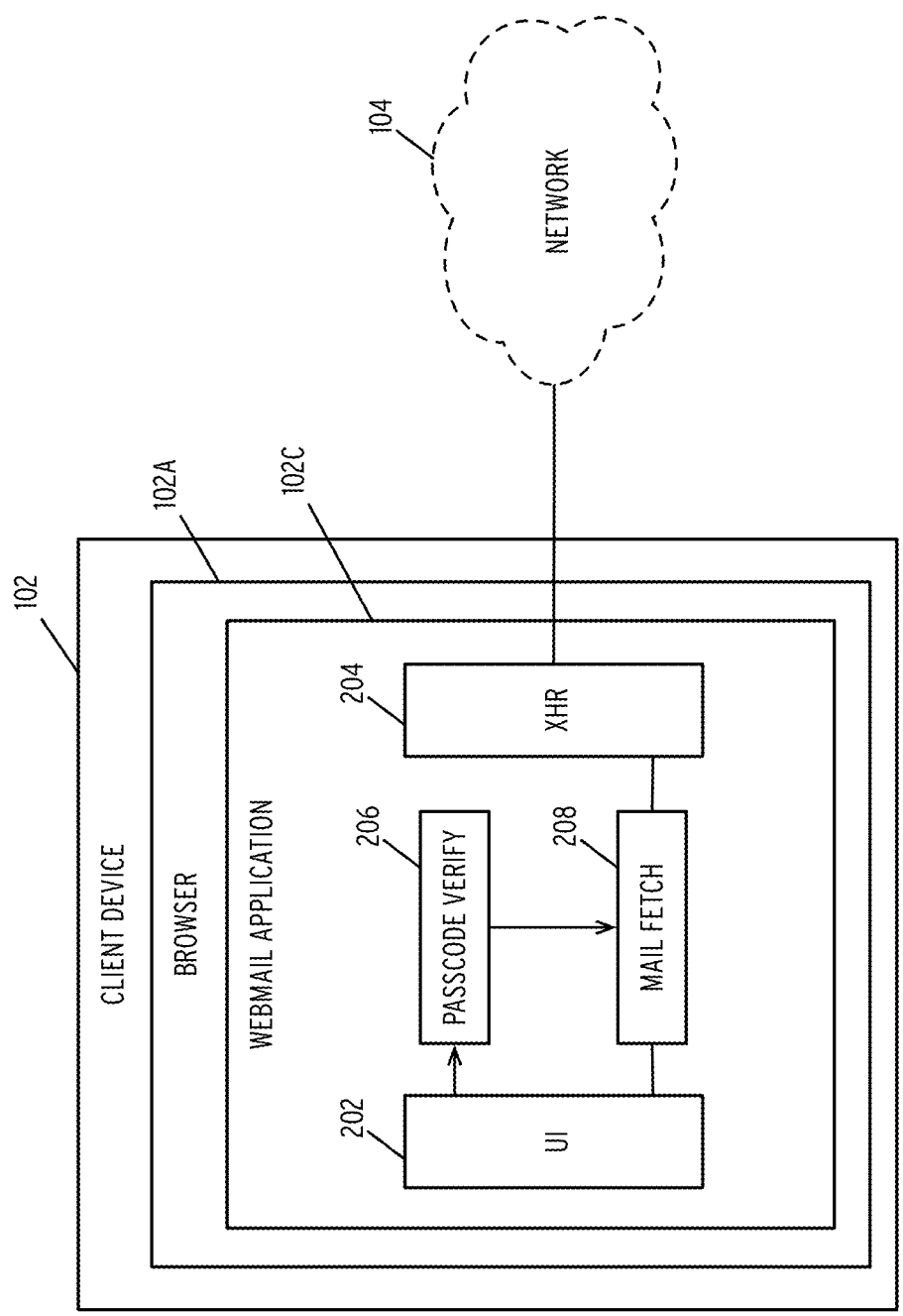
FIG. 2 is a block diagram illustrating a client device for providing multi-level authentication of email messages according to some embodiments of the disclosure.

FIG. 2 is a block diagram illustrating a client device for providing multi-level authentication of email messages according to some embodiments of the disclosure.

As illustrated in FIG. 2, a client device 102 includes a browser 102A executing a webmail application 102C. Details of the client device 102 and browser 102A are provided in the description of FIG. 1 and are not repeated herein.

Webmail application 102C includes a UI 202. In one embodiment, UI 202 comprises an HTML web page and associated CSS and JavaScript files to modify the appearance and functionality of the page, respectively. In one embodiment, libraries 204-208 may be implemented in JavaScript, Dart, or another client-side programming language.

Webmail application 102C includes a network access library 204. In one embodiment, the network access library 204 may comprise an XMLHttpRequest (XHR) library configured to request data asynchronously from server devices via network 104. In some embodiment, network access library 204 is used to issue requests to a server-side mail application to verify passcodes, retrieve mail items, monitor user interactions, perform searches, and other functions discussed in more detail herein.

Webmail application 102C includes a passcode verification library 206. In some embodiments, the passcode verification library 206 is responsible for managing and validating user passcodes associated with files. In one embodiment, the passcode verification library 206 communicates the server devices via network access library 204. In some embodiments, the passcode verification library 206 transmits passcodes (over TLS/SSL) to a server device for verification. In alternative embodiments, passcode verification library 206 may be responsible for validating passwords locally. In this embodiment, passcode verification library 206 additionally stores hashed passcodes received from a server device. Details of the passcode verification library 206 are described more fully in the description of FIGS. 6 and 7, incorporated herein by reference in its entirety.

Webmail application 102C includes a mail fetching library 208. In one embodiment, mail fetching library 208 is configured to monitor events occurring in the UI (or timer events) and issue queries (via network access library 204) to a server device. In one embodiment, these requests comprise HTTP requests, WebSocket requests, or any other type of browser-based request. Mail fetching library 208 receives a status of a passcode from passcode verification library 206. In some embodiments, mail fetching library 208 uses the status to append a hashed passcode to mail requests issued to the server device which instruct the server device to fulfill requests with hidden mail items and folders. In some embodiment, mail fetching library 208 may additionally respond to search queries entered into a search field of UI 202. Details of the mail fetching library 208 are described more fully in connection with FIG.

Figure 3:
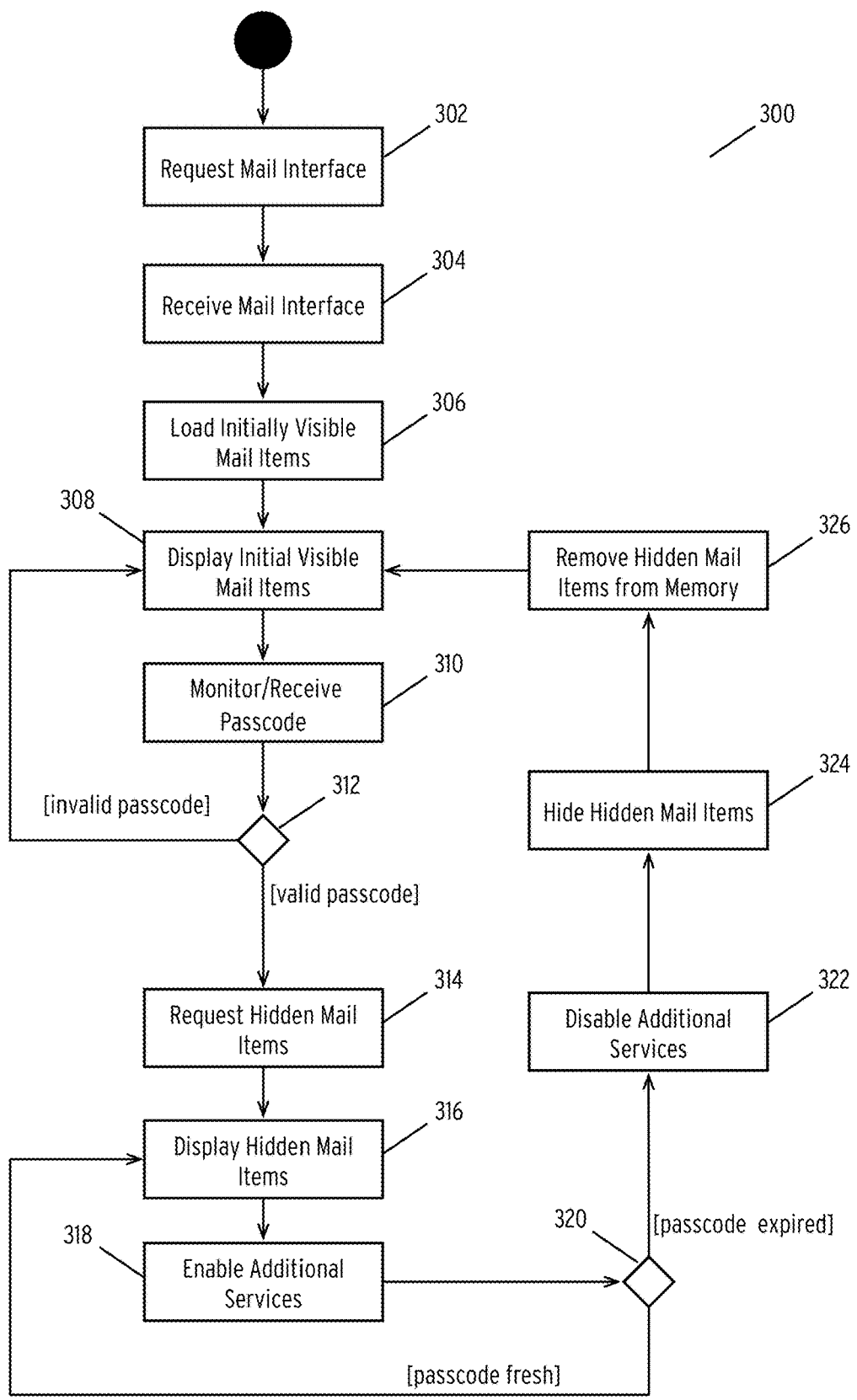
FIG. 3 is a flow diagram illustrating a method for providing multi-level authentication of email messages according to some embodiments of the disclosure.

FIG. 3 is a flow diagram illustrating a method for providing multi-level authentication of email messages according to some embodiments of the disclosure. In one embodiment, a mobile email application or a webmail application may execute the method 300 depicted in FIG. 3. As used herein, an "email application" refers to either a mobile or webmail application.

In step 302, the method requests a mail interface, and in step 304 the method displays the mail interface.

Figure 5:
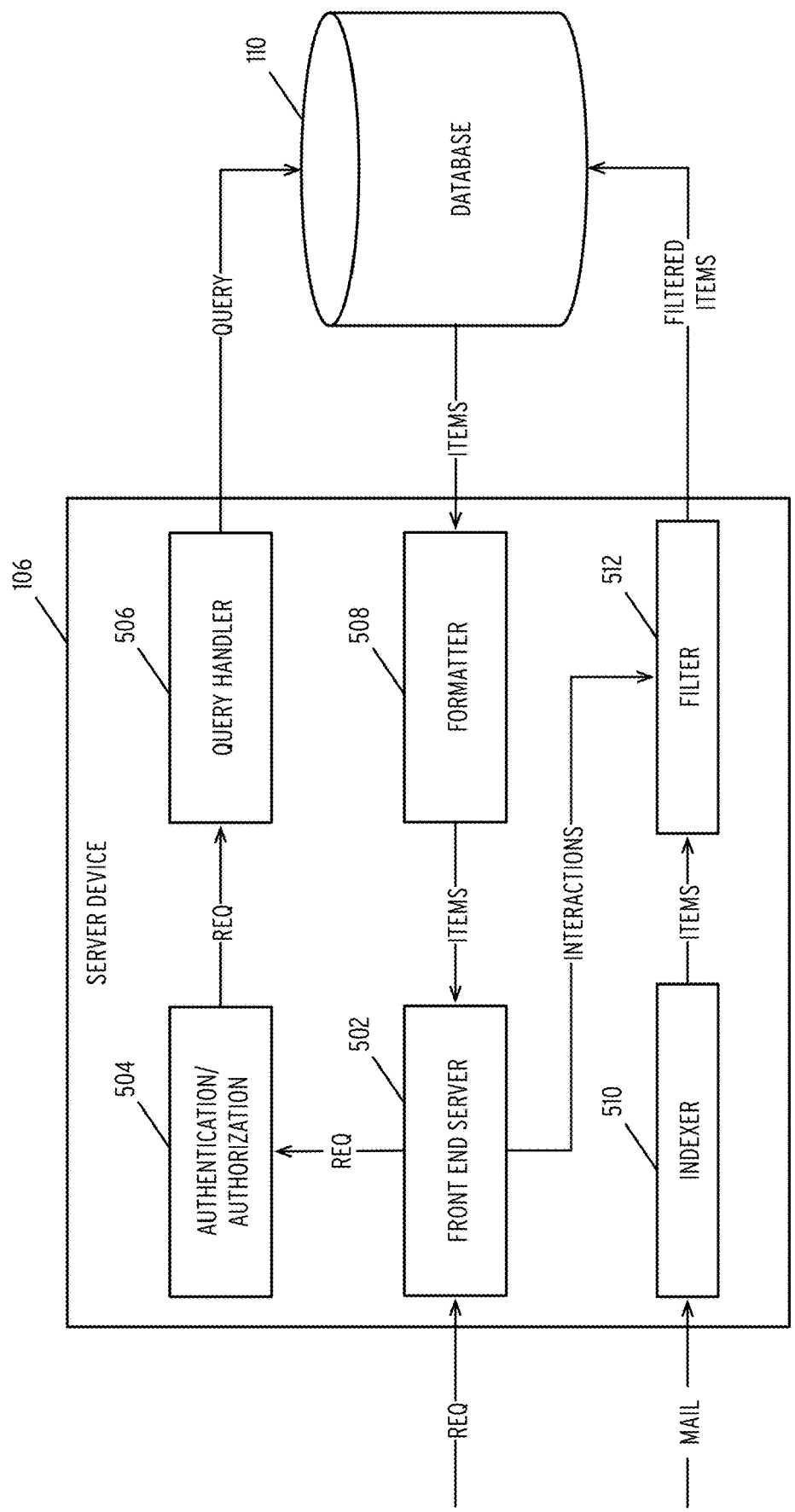
FIG. 5 is a block diagram illustrating a server device for providing multi-level authentication of email messages according to some embodiments of the disclosure.

In one embodiment, requesting a mail interface comprises transmitting an HTTP request to a webmail server (as illustrated in FIG. 5) for a webpage (e.g., HTML, CSS, JavaScript, etc.) that generates a UI for viewing and interacting with email messages.

In the embodiment where a mobile device implements the method, steps 302 and 304 may be omitted. Alternatively, steps 302 and 304 may correspond to downloading an email application (step 302) from an app store and launching the email application (step 304). Alternatively, or in conjunction with the preceding, in some embodiments, a webmail client may be retrieved via a browser of a mobile device. In this scenario, the method performs steps 302 and 304 as described previously.

In step 306, the method loads initially visible items.

In some embodiments, the email application may be transmitted without any mail items included within the initial application. In this scenario, the method may issue supplemental network requests (e.g., via AJAX calls, WebSocket calls, etc.) to retrieve a list of mail items. In some embodiments, the request may include an identifier of the user (e.g., a session identifier) as well as parameters describing the type and amount of mail items to retrieve (e.g., the first 50 items from an "inbox" folder).

In alternative embodiments, the initially visible mail items may be transmitted as part of the email application received in step 304. For example, an HTML page or JavaScript file including the mail items themselves may be returned along with the interface.

In some embodiments, mail items may be received by issuing requests to one or more API endpoints provided by a server device. For example, a client device may issue a request to "http://mail.yahoo.com/items" and include, as a query string or body parameters, details regarding the information requested (e.g., "?folder=inbox&items=50"). Notably, a single endpoint may be utilized for both visible and hidden items (i.e., items protected in a folder protected by a passcode) as will be discussed.

In step 308, the method displays the visible mail items.

In one embodiment, if the mail items are included in the returned email application, a browser or web view may render the items (e.g., in HTML form) at the client device. Alternatively, or in conjunction with the preceding, if the visible items are retrieved asynchronously, the method may insert the new items into the email application. For example, the method may receive a serialized format of the mail items (e.g., JSON) and may convert these serialized items into templates (e.g., HTML templates).

In some embodiments, the method may additionally transmit requests for various other actions undertaken by the user with the email application. For example, moving mail items may issue additional network requests identifying the item and the new location.

In step 310, the method monitors or receives a passcode. Specific techniques for monitoring or receiving a passcode are described more fully in connection with FIGS. 4A and 4B.

In one embodiment, the method monitors keystrokes entered by the user while the email application is active. In this embodiment, the email application may include a library that attaches an event handler (e.g., "onKeyUp") to the email application (e.g., on the BODY element of an HTML page) that is trigger whenever a key is depressed (or released). In this manner, the method continuously monitors what is being typed by a user to determine if a passcode has been entered. In some embodiments, the email application may include multiple event handlers for monitoring keypresses (e.g., to enable "shortcut" keys). In this embodiment, the existing handler may be modified to support the detection of passcodes without interfering with existing shortcut functionality.

In another embodiment, different UIs may be utilized to enter passcodes. For example, the email application may include a form field for entering a passcode. Alternatively, or in conjunction with the preceding, the email application may display a form field in response to a predetermined event (e.g., the selection of a folder or icon) that triggers the display of a form field for entering a passcode. In another embodiment, gestures may be used to validate a passcode instead of text-based methods. This embodiment may be applied primarily to mobile devices. Thus, instead of typing a passcode a user may perform a pre-recorded gesture and this gesture may be compared to a known gesture (e.g., by mapping points of the gesture and generating a textual or binary representation of the gesture).

In some embodiments, monitoring of keystrokes may be disable based on the state of the email application. For example, when a user focuses on a text field, the method may be disabled (e.g., when a user is typing an email).

Figure 4A:
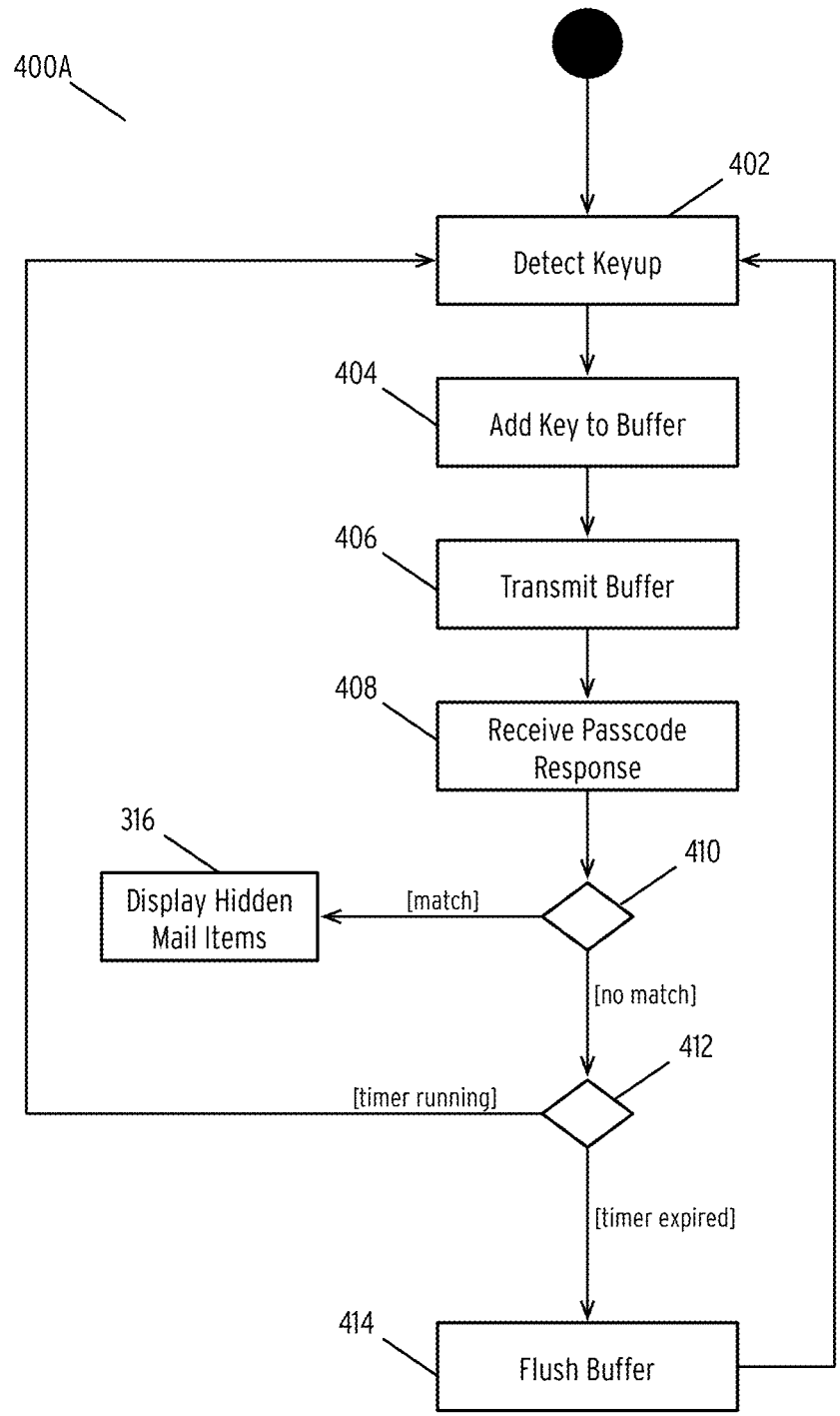
FIGS. 4A and 4B are flow diagrams illustrating alternative embodiments for detecting a passcode by a client device according to some embodiments of the disclosure.
Figure 4B:
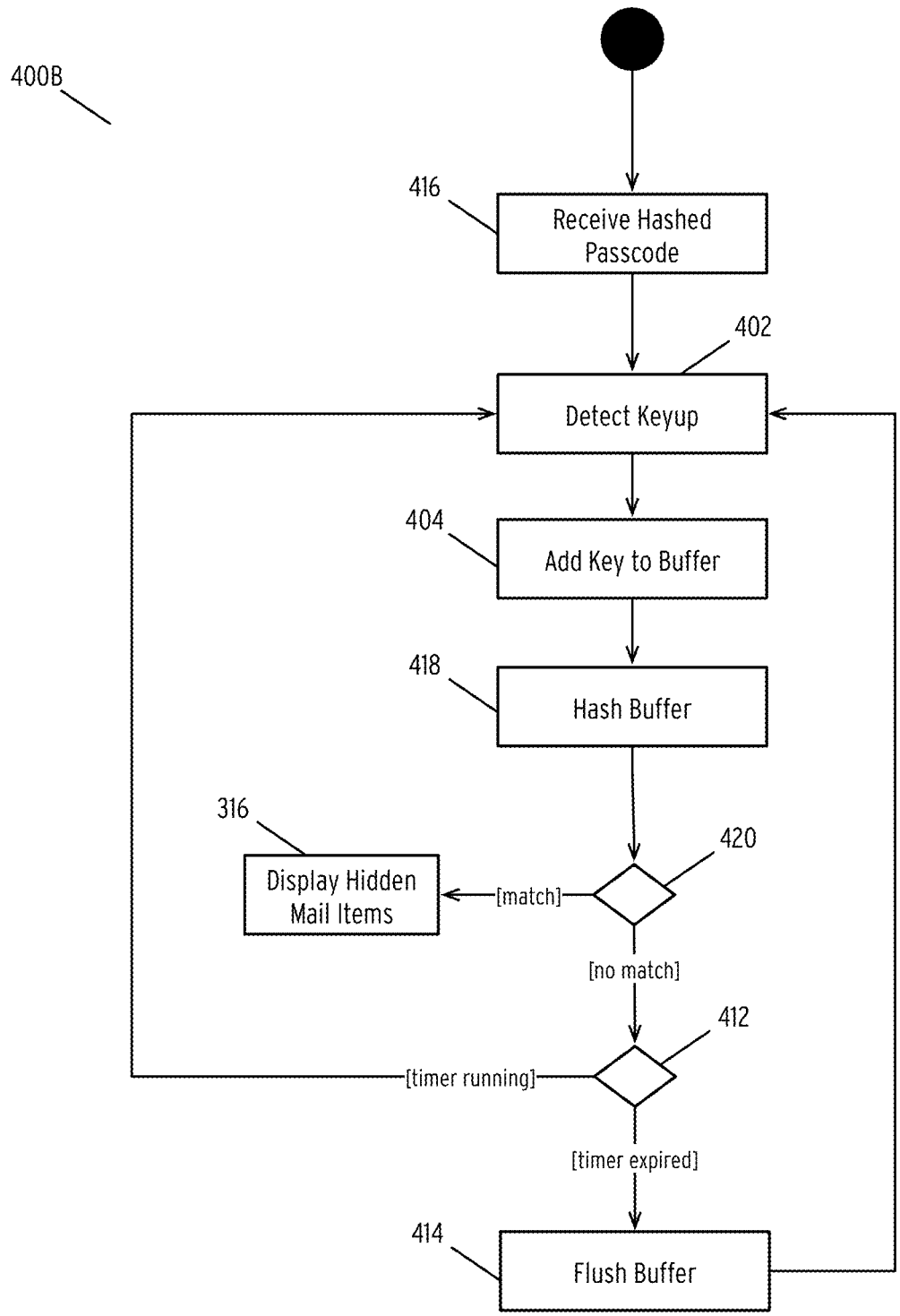

In step 312, if the method detects an invalid passcode, the method continues to display the initially visible items (step 308). As used herein an invalid passcode refers to a string of characters that does not match an existing passcode and does not refer to a malicious attempt (although malicious attempts may be subsumed into invalid passcodes). In general, an invalid passcode may be detected while a user is typing the passcode. For example, if the passcode is "abcd," the candidate passcodes "a," "ab," and "abc" are "invalid"

passcodes that result in the method not proceeding. In one embodiment, a valid passcode comprises a candidate passcode that is equal to a known passcode. FIGS. 4A and 4B describe various techniques regarding how passcodes are validated, the disclosure of which is incorporated herein by reference in its entirety.

Alternatively, if, in step 312, the method detects a valid passcode, the method proceeds to request hidden mail items in step 314.

In one embodiment, requesting hidden mail items may comprise issuing a network request (e.g., API call, etc.) to a server device similar to the methods described in connection with step 306. In this step, however, the method may include a passcode to "unlock" access to folders associated with the passcode (and mail items in said folders). For example, the method can hash the valid passcode to generate an irreversible representation of the passcode and include the hashed passcode in a query string of a request. In this manner, the client may continue to issue requests to the mail server using the existing network library and simply append the hashed passcode to instruct the server to provide access to hidden mail items.

In one embodiment, hidden folders and hidden items within hidden folders may be shared across multiple accounts or for multiple users. For example, a given user may have multiple email accounts. In this embodiment, a hidden folder may be used to secure email message received from each account. Thus, if a user has two personal email accounts and receives confidential emails from attorneys at each account, a single hidden folder may be shared across those two personal email accounts. Similarly, two separate users may be part of a single team, yet still retain two separate email addresses (and, thus, accounts). In this embodiment, a single hidden folder may be created for both users. Continuing the previous example, two users on a single team may both receive email messages from a single attorney. In this case, a single hidden folder for both users may be created that filters messages from the attorney into the single hidden folder. In this embodiment, the hidden folder may be assigned a single passcode that both users may use. In an alternative embodiment, the hidden folder may be assigned separate passcode unique to each user. As will be describe in more detail in FIGS. 6 through 8, automatic filtering rules may be created based on the user interactions of both users to further refine or speed up the filter building process. That is, a first user's interactions may "prime" the filtering rules such that when a second user first uses the email application, the rules are already in place.

In some embodiments, steps 310 and 312 may be replaced with a location-based authentication system. In these embodiments, the method monitors a user's location (e.g., via GPS coordinates of a mobile device or by and HTML5 location API) and determines whether the user is within a known geo-fenced zone (e.g., a home or office). If the method determines that a user is within a predefined geo-fenced zone, the method may determine that hidden folders should be enabled. Thus, upon this determine the method may execute step 314. In this manner, users may define zones wherein hidden folders should be enabled (e.g., a home, office, etc.) and may not be required to manually enter passcodes when using a client device in those zones.

In some embodiments, the method may further utilizes a two- or three-factor authentication system. Thus, after confirming a passcode, a text message may be sent to a phone number associated with the user with a verification code and the user may enter this verification code into the UI to complete the validation process.

In step 316, the method displays the hidden items returned by a server in response to the request issued in step 314. Details of this step may be like those described in step 308, the disclosure of which is incorporated herein by reference in its entirety.

In step 318, the method enables additional services.

In one embodiment, additional services refer to additional functionality provided by the email application. For example, search, mail manipulation (e.g., move, delete, reply), and other services related to mail items may be enabled in step 318. In some embodiments, additional services may be enabled in parallel with step 314.

In step 320, the method determines if a passcode is fresh or expired.

As used herein, a passcode may be associated with a timer that determines how long the method should display hidden items. In some embodiments, the method may monitor user interaction with the email application to determine whether to expire the passcode. In another embodiment, the timer may be a fixed period. If the passcode is still fresh (i.e., hidden items should still be displayed), the method continues to display the hidden mail items in step 314.

Alternatively, the passcode has expired (e.g., due to inactivity), the method disables the additional services in step 322. In one embodiment, disabling the additional services may comprise setting a flag that indicates that method calls for the additional services (with respect to hidden items) are disallowed. Additionally, the method may notify the server that the passcode has expired and that future requests for additional services relating to hidden items should be denied (e.g., via an HTTP 403 response).

In step 324, after detecting an expired passcode, the method hides hidden mail items. In one embodiment, this step comprises removing the mail items from the render tree of the mail application. For example, in a webmail example, the method may remove any hidden items from the DOM tree of the email application. In a mobile application example, the method may call a destroy method on the UI component representing the hidden item.

In step 326, the method removes the hidden mail items from memory.

While in step 324, the method removes the hidden items from view, the hidden items may persist in memory after hiding the items. For example, in a webmail application the items may be stored in the model layer of the application (e.g., in a JavaScript object). Thus, in step 326, the method explicitly deallocates the underlying data representing the hidden mail items. In the mobile application scenario, the method may similarly call a destructor on the underlying mail item. Thus, in this manner, the hidden mail items are completely removed from the client device and are again inaccessible.

Finally, the method may then continue to provide access to non-hidden mail items and additional services related to non-hidden mail items in step 308 until receiving another passcode.

FIGS. 4A and 4B are flow diagrams illustrating alternative embodiments for detecting a passcode by a client device according to some embodiments of the disclosure.

FIG. 4A specifically illustrates a network-enabled method for detecting a passcode by a client device.

In step 402, the method detects a keyup event.

In the webmail example, the method may attach an event handler to a keyUp event of an HTML element (e.g., a BODY element) to monitor key presses. In one embodiment, detecting a keyup event comprises identifying a specific key pressed by a user either via a string representation or a numerical representation.

In step 404, the method adds the key in the keyup event to a buffer.

The method accumulates keypresses into a buffer (e.g., an array or list) to convert a keyup to a passcode. As will be described below, the method additionally manages the buffer to ensure the buffer does not overflow or capture unnecessary data.

In step 406, the method transmits the buffer to a server device for validation.

As illustrated, the method continuously issues network requests as a user types. For example, the following sequence of requests may be issued:

1. GET/passcode_verify?c=p
2. GET /passcode_verify?c=pa
3. GET /passcode_verify?c=pas
4. GET /passcode_verify?c=pass Thus, the method continually checks the buffer to determine when, if ever, the buffer matches a known passcode.

In step 408, the method receives a passcode response.

In the above example, the method may receive an invalid passcode response for requests (1) through (3) and a valid passcode response for request (4) if the known passcode is "pass." In this manner, the method may prevent any passcodes from being stored locally on the client device.

In step 410, if the buffer and known passcode matches, the method displays the hidden items in step 316 (previously discussed in FIG. 3, the description incorporated by reference in its entirety).

Alternatively, if the server returns a response indicating the buffer does not match a known passcode, the method continues to execute while a timer is still running. As discussed above, the method may utilize a short timer to prevent buffer overflow. For example, a timer may be initialized to reset the method every ten seconds. The specific timer duration may be determined based on monitoring the average speed users enter passcodes.

Once the timer expires, in step 416, the method flushes the buffer. Like removing items from memory, flushing a buffer may comprise deallocating the objects stored within an array or list (or the entire array or list itself). After flushing the buffer, the method resets the timer and continues monitoring keyup events.

FIG. 4B illustrates an "offline" method for detecting a passcode by a client device where security is more constrained.

In step 416, the method receives a hashed passcode.

In this embodiment, a client application may receive one or more passcodes from a server. Since the passcodes are sensitive, they may be hashed using a one-way hashing algorithm (e.g., MD5, SHA-256, etc.). In the illustrated embodiment, the method may store the hashed passcode temporarily in memory while the email application executes.

In steps 402 and 404, the method detects a keyup and adds a keyup to a buffer as described in connection with FIG. 4A.

In step 418, the method hashes the buffer. In this embodiment, hashing the buffer comprises applying the same hashing function applied to the passcodes received in step 418 (e.g., via MD5, SHA-256, etc.).

In step 420, the method checks if the hashed buffer matches the hashed buffer.

If the hashed buffer and hashed passcode from the server match, the method displays the hidden items in step 316 (previously discussed in FIG. 3, the description incorporated by reference in its entirety).

Alternatively, if the hashed buffer and hashed passcode do not match the method continues executing until a timer expires (step 412) and flushes the buffer once the timer expires (step 416). Details of these steps are described in the description of FIG. 4A and are not repeated herein but are incorporated by reference.

In one embodiment, the method in FIG. 4B may only be utilized by a mobile application. This is because the mobile application is less susceptible to tampering by third parties or subject to memory leaks from a web browser. Alternatively, the method in FIG. 4A may be equally applied to either a web browser or a mobile application.

FIG. 5 is a block diagram illustrating a server device for providing multi-level authentication of email messages according to some embodiments of the disclosure.

Server device 106 includes a front end server 502 configured to receive requests from webmail applications or email apps installed or executed on client devices. In some embodiments, front end server 502 comprises a web server. Front end server 502 may additionally include an API for programmatic requests received from clients (e.g., via asynchronous network calls). Front end server 502 provides the user interface for webmail applications using the server device, as discussed above. Thus, the front end server 502 builds responses, generates HTML pages, and serves assets from an asset network (not illustrated).

Front end server 502 forwards requests to authentication and authorization (AA) middleware 504. AA middleware 504 comprises one or more executable functions that analyze incoming requests and authorize or deny the requested action. In some embodiment, AA middleware 504 perform user authentication and authorization for a given email account. Additionally, AA middleware 504 may perform passcode verification as described in FIGS. 3, 4A, and 4B. In one embodiment, during passcode verification, AA middleware 504 checks the query string (or POST body) of a request to confirm a passcode associated with the request.

After authorizing a request, AA middleware 504 forwards the request to query handler 506. Since the request was previously authorized, query handler 506 primarily converts the HTTP request into a query that database 110 can understand. For example, query handler 506 may convert the parameters of the HTTP request into an SQL query or another type of query.

In response to queries, database 110 returns a set of items to formatter 508. In one embodiment, since data return from database 110 may be in a structured format, formatter 508 converts the return listing of items into a serialized format for use by front end server 502 (e.g., a native programming language array-like structure). Front end server 502 receives the items and generates a response to the request that initiated the process, as described above.

In addition to serving requests from the client device, server device 106 additionally receives mail items from mail servers (as discussed in the description of FIG. 1). Mail items may initially be indexed by indexer 510. In one embodiment, indexer 510 creates an index (e.g., an inverted index) for each item received. Indexer 510 may additionally create secondary indexes on heavily search parts of the mail items (e.g., body, subject, etc.). After indexing, the items are filtered by filter 512.

In one embodiment, filter 512 analyzes each item to generate rules or apply rules to incoming mail items. Specifically, filter 512 assigns incoming mail items a folder identifier based on one or more stored rules. In some embodiments, these rules may be specified manually by a user. In alternative embodiments, these rules may be learned from interactions received from front end server 502. Techniques for learning rules, maintaining a rule set, and applying rules are described more fully in the description of FIGS. 6 through 8, which is incorporated herein by reference in its entirety.

Figure 6:
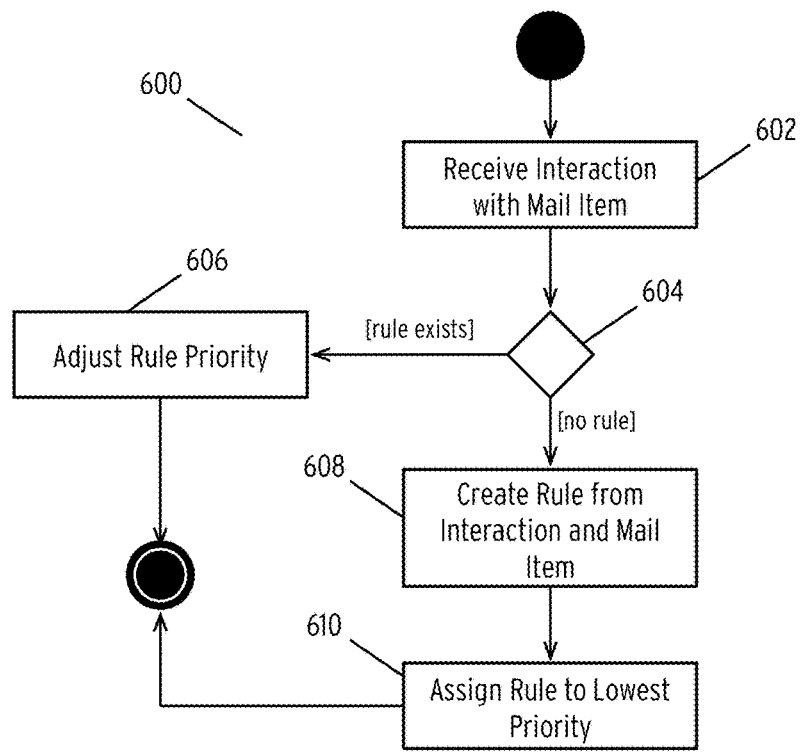
FIG. 6 is a flow diagram illustrating a method for managing filtering rules according to some embodiments of the disclosure.

FIG. 6 is a flow diagram illustrating a method for managing filtering rules according to some embodiments of the disclosure.

In step 602, the method 600 receives an interaction with a mail item.

In one embodiment, an interaction may be received via a network request issued by a client application as discussed previously. For example, the client application may be equipped with a logging library that monitors key, mouse, and touch events among other events (e.g., network connectivity, etc.). This logging library may transmit events as they occur on a client device or as a batch update. Examples of interactions comprise moving mail items from one folder to another, deleting mail items, etc.

In one embodiment, an interaction includes an interaction type comprising either a low-level type (mouse move) or high-level type (e.g., move item). The interaction additionally includes details regarding the items affected by the interaction. For example, the interaction may include an identifier of a mail item interacted with. In some embodiments, the interaction may include details of the mail item in the interaction (e.g., to, from, carbon copy parameters as well as the subject and body). However, in alternative embodiments, these details may be retrieved by the server based on a message identifier. Finally, for moves, the interaction may include a move target (i.e., folder) and a previous folder (i.e., the folder moved from).

In step 604, the method 600 determines if a rule exists. If it does, the method 600 adjusts the priority of the rule. Adjusting the priority of a rule is described more fully in connection with FIG. 7, the details of which are incorporated herein by reference in their entirety.

In one embodiment, determining if a rule exists comprises analyzing the parameters of the interaction and matching these parameters to a rule set. In one embodiment, a rule set includes the types of parameters included in an interaction.

For example, a rule set may include a target folder and conditions for moving an item to the target folder. These conditions may comprise features of a mail item such as a sender, a string to matching in the subject or body, a time of day, or any other feature of an email message. In step 604, the method 600 may determine if a rule set first matches a folder of a move interaction. If so, the method 600 may iterate through the rules associated with the folder to determine if the interaction parameters match the conditions.

If the method 600 determines that no rule matches the interaction, the method 600 creates a rule from the interaction and the mail item in step 608.

As described above, a rule includes a target folder and mail properties (e.g., senders, subjects, etc.). In one embodiment, the rule created in step 608 may comprise a rule that directs all messages from the sender in the interaction parameters to a folder included in the interaction parameters. In some embodiments, the method 600 may use natural language processing toolkits to assign a meaning to the subject and body of the email message and use this meaning as a condition. In some embodiments, the method 600 may use a classifier to classify the message and use this classification as a rule for moving future messages.

In step 610, the method 600 assigns the rule to a lowest priority level.

Figure 7:
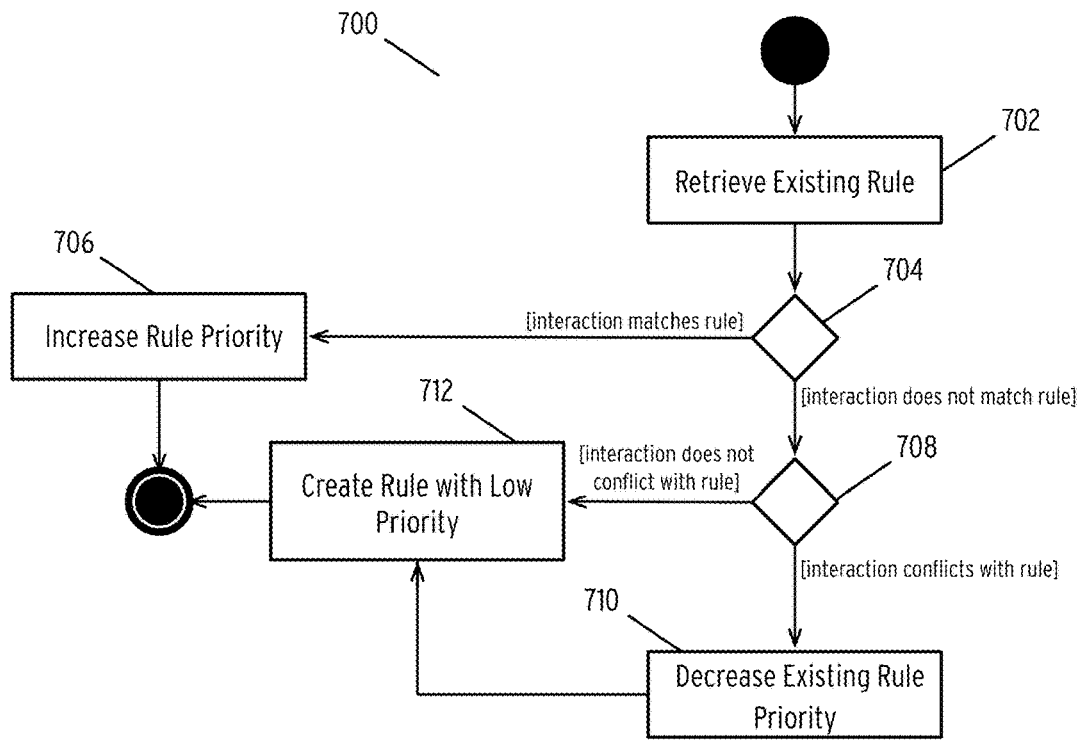
FIG. 7 is a flow diagram illustrating a method for adjusting a filtering rule based on email interactions according to some embodiments of the disclosure.

As described in more detail in FIG. 7, the method 600 may assign priorities to rules to ensure that higher priority rules are always executed, while lower priority rules are disabled until they are verified as proper rules. Thus, the method 600 may generate many rules in FIG. 6, but only those rules with high priorities (e.g., rules corresponding to repeated interactions) may be executed in production. After step 610 (or step 606), the method 600 ends and is repeated for future interactions.

FIG. 7 is a flow diagram illustrating a method 700 for adjusting a filtering rule based on email interactions according to some embodiments of the disclosure.

In step 702, the method 700 receives an existing rule as discussed in the description of FIG. 6.

In step 704, the method 700 determines if the interaction matches the rule. If so, the method 700 increases the priority of the rule in step 706. In one embodiment, a priority may comprise an integer value wherein each rule is ranked according to the integer value as compared to integer values of other rules. As illustrated, increasing the priority due to a match of an existing rule reflects that the interaction has been repeated and thus is likely a higher priority interaction (and thus rule).

Alternatively, if the method 700 determines that the interaction does not match a rule, the method 700 determines if the interaction conflicts with a rule, in step 708.

An interaction may conflict with a rule if the parameters of the interaction are opposed in at least one dimension to an existing rule. For example, a rule may specify that all email from sender "attorney@patentlaw.com" be routed to a hidden folder named "patents." In step 702, the method 700 may receive an interaction moving a message from "attorney@patentlaw.com" to a different folder. Thus the interaction is not expected given the previous interactions and rules generated therefrom. Alternatively, the interaction may comprise deleting an email from "attorney@patentlaw.com." In this scenario, the interaction does not conflict with a dimension of the rule: the sender is the same, and the action (move vs. delete) are different.

If the interaction does not conflict with the existing rules, the method 700 ends. More accurately, the method 700 may create a rule with a lowest priority in step 712 and end. Creating a rule in step 712 is identical to that described in steps 608 and 610, the disclosure of which is incorporated herein by reference.

Alternatively, if the interaction conflicts with the existing rule, the method 700 decreases the priority of the existing rule in step 712. In one embodiment, this comprises decreasing an integer priority of the existing rule. Continuing the previous example, moving a message to a folder that conflicts with a rule decreases the confidence of the original rule thus the priority is lowered. Additionally, a new rule for the interaction is created with the lowest priority in step 712.

Thus, in FIGS. 6 and 7, a set of rules can be continually refined over time based on user interactions with email items.

Figure 8:
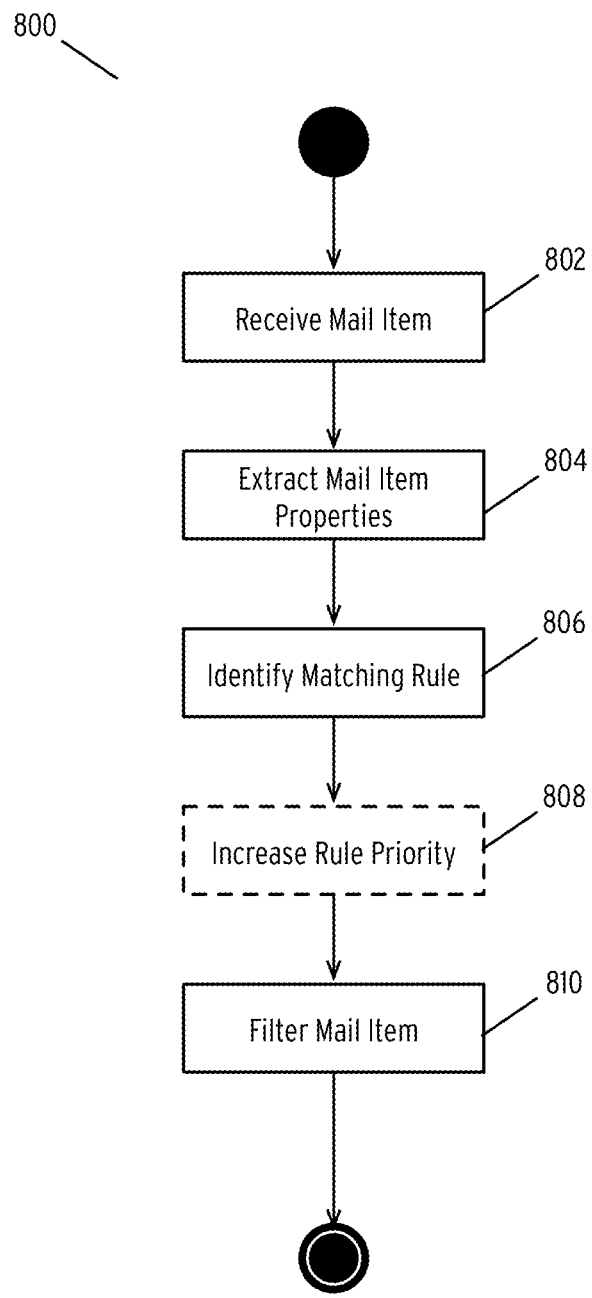
FIG. 8 is a flow diagram illustrating a method for filtering email messages according to some embodiments of the disclosure.

FIG. 8 is a flow diagram illustrating a method for filtering email messages according to some embodiments of the disclosure.

In step 802, the method 800 receives a new mail item.

In one embodiment, new mail items may be received by a server device via a mail server as described previously.

In step 804, the method 800 extracts mail item properties.

In one embodiment, mail item properties comprise any data included in the mail item such as sender email addresses, recipient email addresses, subjects, body contents, attachments, timestamps, etc.

In step 806, the method 800 identifies a matching rule.

As discussed in the description of FIGS. 6 and 7, matching rules may contain conditions for filtering mail items to folders. In one embodiment, these conditions correspond to mail item properties. Thus, in step 806, the method queries a database of rules to identify at least one rule that includes a condition corresponding to a mail item property. In some embodiments, the method may determine that the email message is part of a chain and may identify rules associated with other items in the chain.

In step 808, the method 800 optionally increase the rule priority if a matching rule is found.

In some embodiments, the method 800 may eschew increasing the priority of a rule matching a new mail item. However, in some embodiments, the fact that a rule matches a new mail item indicates that the rule is important. In some embodiments, the increase in priority in step 808 may be a fractional value. In this case, the priorities discussed in FIGS. 6 and 7 would necessarily be stored as double or floating-point numbers. Alternatively, the priorities may be adjusted in increments such that adjustments in FIGS. 6 and 7 are in increments of 10 whereas increments in step 808 may be in increments of one.

Finally, in step 810, the method 800 filters the mail item based on the identified rule. In one embodiment, a mail item is assigned to a folder by assigning a folder identifier to the mail item before storing the mail item in a database. In one embodiment, filtering a mail item may comprise assigning the mail item to a folder.

While the preceding description focuses on mail items, the techniques described may be applied to any digital content item. For example, above methods, systems, and devices may be applied to a text-messaging system whereby sensitive messages are automatically filtered into hidden text message folders. Similarly, in a photo sharing system, sensitive photos may be filtered to hidden folders. These hidden items may be displayed using similar techniques to those discussed in the context of email items.

In one embodiment, the methods described in FIGS. 6 through 8 may be limited to hidden folder interactions (e.g., moving items to hidden folders) to reduce the processing load of the server device.

Furthermore, while primarily described in the context of filtering items into hidden folders. The methods, devices, and systems may further be extended to "hide" other aspects of an application (e.g., settings, standard filters, etc.).

Figure 9:
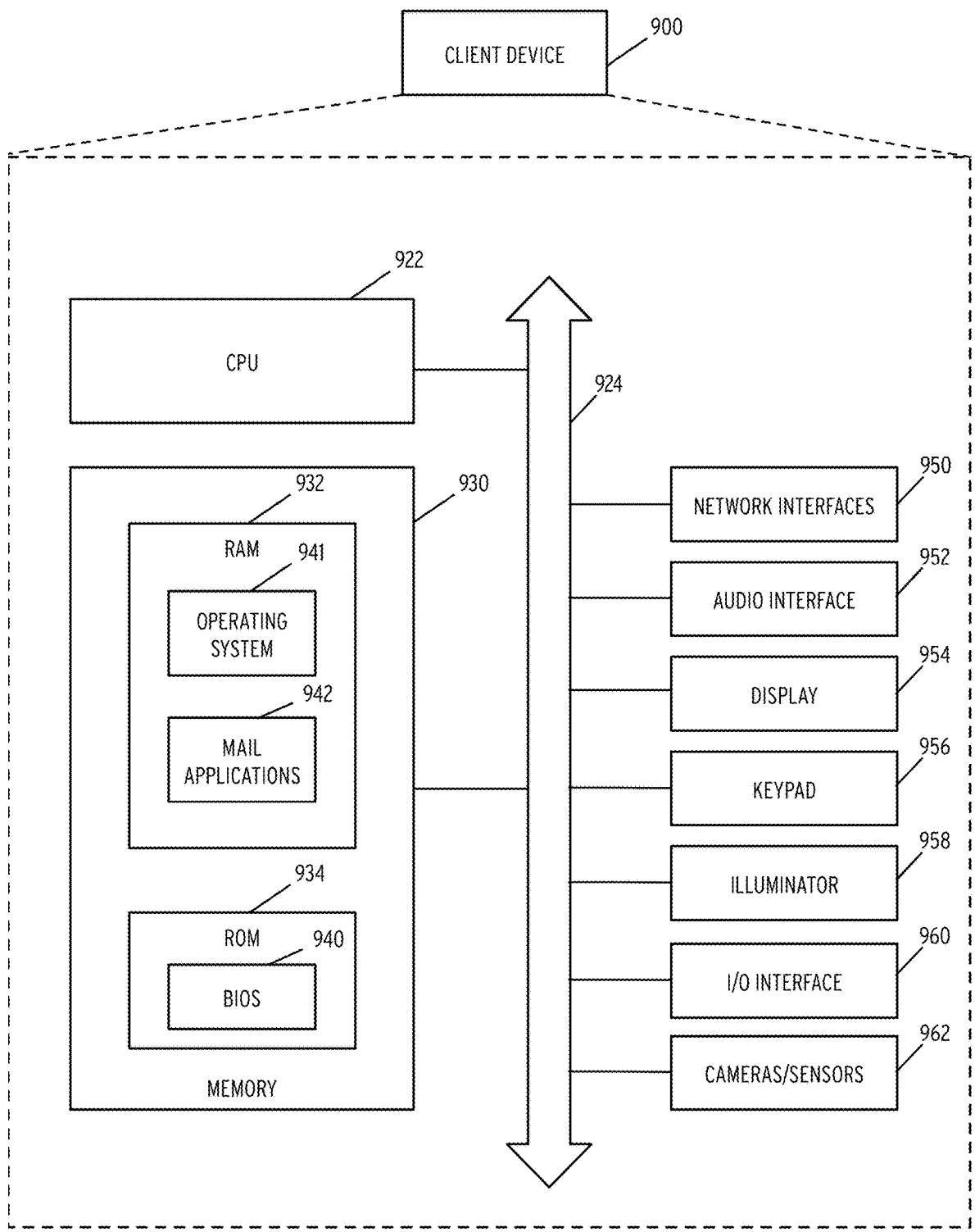
FIG. 9 is a hardware diagram illustrating a client device for providing multi-level authentication of email messages according to some embodiments of the disclosure.

FIG. 9 is a hardware diagram illustrating a client device for providing multi-level authentication of email messages according to some embodiments of the disclosure.

Client device 900 may include many more or fewer components than those shown in FIG. 9. However, the components shown are sufficient to disclose an illustrative embodiment for implementing the present disclosure. Client device 900 may represent, for example, client devices discussed above in relation to FIGS. 1 and 2.

As shown in FIG. 9, client device 900 includes a processing unit (CPU) 922 in communication with a mass memory 930 via a bus 924. Client device 900 also includes one or more network interfaces 950, an audio interface 952, a display 954, a keypad 956, an illuminator 958, an input/output interface 960, and a camera(s) or other optical, thermal or electromagnetic sensors 962. Client device 900 can include one camera/sensor 962, or a plurality of cameras/sensors 962, as understood by those of skill in the art.

Client device 900 may optionally communicate with a base station (not shown), or directly with another computing device. Network interface 950 includes circuitry for coupling client device 900 to one or more networks, and is constructed for use with one or more communication protocols and technologies. Network interface 950 is sometimes known as a transceiver, transceiving device, or network interface card (NIC).

Audio interface 952 is arranged to produce and receive audio signals such as the sound of a human voice. For example, audio interface 952 may be coupled to a speaker and microphone (not shown) to enable telecommunication with others and/or generate an audio acknowledgement for some action. Display 954 may be a liquid crystal display (LCD), gas plasma, light emitting diode (LED), or any other type of display used with a computing device. Display 954 may also include a touch sensitive screen arranged to receive input from an object such as a stylus or a digit from a human hand.

Keypad 956 may comprise any input device arranged to receive input from a user. For example, keypad 956 may include a push button numeric dial, or a keyboard. Keypad 956 may also include command buttons that are associated with selecting and sending images. Illuminator 958 may provide a status indication and/or provide light. Illuminator 958 may remain active for specific periods of time or in response to events. For example, when illuminator 958 is active, it may backlight the buttons on keypad 956 and stay on while the client device is powered. Also, illuminator 958 may backlight these buttons in various patterns when particular actions are performed, such as dialing another client device. Illuminator 958 may also cause light sources positioned within a transparent or translucent case of the client device to illuminate in response to actions.

Client device 900 also comprises input/output interface 960 for communicating with external devices, such as external hard drives, peripherals, or other input or devices not shown in FIG. 9. Input/output interface 960 can utilize one or more communication technologies, such as USB, infrared, Bluetooth™, or the like.

Mass memory 930 includes a RAM 932, a ROM 934, and other storage means. Mass memory 930 illustrates another example of computer storage media for storage of information such as computer readable instructions, data structures, program modules or other data. Mass memory 930 stores a basic input/output system ("BIOS") 940 for controlling low-level operation of client device 900. The mass memory also stores an operating system 941 for controlling the operation of client device 900. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 930 further includes one or more data stores, which can be utilized by client device 900 to store, among other things, mail applications 942 and/or other data. For example, data stores may be employed to store information that describes various capabilities of client device 900. The information may then be provided to another device based on any of a variety of events, including being sent as part of a header during a communication, sent upon request, or the like. At least a portion of the capability information may also be stored on a disk drive or other storage medium (not shown) within client device 900.

Mail applications 942 may include computer executable instructions which, when executed by client device 900, enable the display of an email client (either webmail, mobile, or desktop) and provide the functionality described in the preceding embodiments disclosed in FIGS. 1-8.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   monitoring, by a client device via a background process of an email application, keystrokes of a user of the client device;
   generating, by the background process, a candidate passcode based on the keystrokes;
   comparing, by the background process, the candidate passcode to a known passcode; and
   displaying, at the client device, one or more hidden items in a user interface of the email application upon determining that the candidate passcode is equal to the known passcode.

2. The method of claim 1, further comprising:
   rendering, by the email application, one or more visible email items; and
   monitoring, by the background process, the keystrokes while rendering the one or more visible email items.

3. The method of claim 2, wherein rendering one or more visible email items comprises rendering a web page displaying the one or more visible email items.

4. The method of claim 2, wherein rendering one or more visible email items comprises rendering a web view in the email application, the web view displaying the one or more visible email items and the email application comprising a mobile application.

5. The method of claim 1, further comprising:
   issuing, by the email application, a network request to an email server upon determining that the candidate passcode is equal to the known passcode;
   receiving, by the email application, the one or more hidden items from the email server in response to the network request; and
   rendering, by the email application, the one or more hidden items in the user interface.

6. The method of claim 1, further comprising enabling, by the email application, one or more actions associated with the one or more hidden items upon determining that the candidate passcode is equal to the known passcode, the one or more actions comprising operations manipulating the one or more hidden items.

7. The method of claim 1, further comprising removing, by the email application, the one or more hidden items upon determining that the candidate passcode has expired.

8. A non-transitory computer-readable storage medium for tangibly storing computer program instructions capable of being executed by a computer processor, the computer program instructions defining steps of:
   monitoring, via a background process of an email application, keystrokes of a user;
   generating, by the background process, a candidate passcode based on the keystrokes;
   comparing, by the background process, the candidate passcode to a known passcode; and
   displaying one or more hidden items in a user interface of the email application upon determining that the candidate passcode is equal to the known passcode.

9. The non-transitory computer-readable storage medium of claim 8, the computer program instructions further defining steps of:
   rendering, by the email application, one or more visible email items; and
   monitoring, by the background process, the keystrokes while rendering the one or more visible email items.

10. The non-transitory computer-readable storage medium of claim 9, wherein rendering one or more visible email items comprises rendering a web page displaying the one or more visible email items.

11. The non-transitory computer-readable storage medium of claim 9, wherein rendering one or more visible email items comprises rendering a web view in the email application, the web view displaying the one or more visible email items and the email application comprising a mobile application.

12. The non-transitory computer-readable storage medium of claim 8, the computer program instructions further defining steps of:
   issuing, by the email application, a network request to an email server upon determining that the candidate passcode is equal to the known passcode;

receiving, by the email application, the one or more hidden items from the email server in response to the network request; and rendering, by the email application, the one or more hidden items in the user interface.

13. The non-transitory computer-readable storage medium of claim 8, the computer program instructions further defining a step of enabling, by the email application, one or more actions associated with the one or more hidden items upon determining that the candidate passcode is equal to the known passcode, the one or more actions comprising operations manipulating the one or more hidden items.

14. The non-transitory computer-readable storage medium of claim 8, the computer program instructions further defining a step of removing, by the email application, the one or more hidden items upon determining that the candidate passcode has expired.

15. A device comprising:

a processor; and a storage medium for tangibly storing thereon program logic for execution by the processor, the program logic comprising:

logic, executed by the processor, for monitoring, via a background process of an email application, keystrokes of a user;

logic, executed by the processor, for generating, by the background process, a candidate passcode based on the keystrokes;

logic, executed by the processor, for comparing, by the background process, the candidate passcode to a known passcode; and logic, executed by the processor, for displaying one or more hidden items in a user interface of the email application upon determining that the candidate passcode is equal to the known passcode.

16. The device of claim 15, the program logic further comprising:

logic, executed by the processor, for rendering, by the email application, one or more visible email items; and logic, executed by the processor, for monitoring, by the background process, the keystrokes while rendering the one or more visible email items.

17. The device of claim 16, wherein rendering one or more visible email items comprises rendering a web page displaying the one or more visible email items.

18. The device of claim 16, wherein rendering one or more visible email items comprises rendering a web view in the email application, the web view displaying the one or more visible email items and the email application comprising a mobile application.

19. The device of claim 15, the program logic further comprising:

logic, executed by the processor, for issuing, by the email application, a network request to an email server upon determining that the candidate passcode is equal to the known passcode;

logic, executed by the processor, for receiving, by the email application, the one or more hidden items from the email server in response to the network request; and logic, executed by the processor, for rendering, by the email application, the one or more hidden items in the user interface.

20. The device of claim 15, the program logic further comprising logic, executed by the processor, for enabling, by the email application, one or more actions associated with the one or more hidden items upon determining that the candidate passcode is equal to the known passcode, the one or more actions comprising operations manipulating the one or more hidden items.

\* \* \* \* \*